(12) United States Patent
Barzilai et al.

(10) Patent No.: US 8,884,453 B2
(45) Date of Patent: Nov. 11, 2014

(54) GENERATOR SYSTEM FOR REUSING EXHAUST AIR

(76) Inventors: Yinon Barzilai, San Diego, CA (US); Guy Louis Barzilai, San Diego, CA (US); Karen Gal Barzilai, San Diego, CA (US)

( * ) Notice: Subject to any disclaimer, the term of this patent is extended or adjusted under 35 U.S.C. 154(b) by 0 days.

(21) Appl. No.: 13/436,611

(22) Filed: Mar. 30, 2012

(65) Prior Publication Data
US 2012/0286515 A1    Nov. 15, 2012

Related U.S. Application Data

(63) Continuation-in-part of application No. 13/107,938, filed on May 15, 2011, now abandoned.

(51) Int. Cl.
*B60L 11/12* (2006.01)
*H02P 9/04* (2006.01)
*F03D 9/00* (2006.01)

(52) U.S. Cl.
CPC ............. *F03D 9/00* (2013.01); *F05B 2220/602* (2013.01); *Y02E 10/72* (2013.01)
USPC .......................................................... 290/50

(58) Field of Classification Search
USPC .......................................................... 290/50
See application file for complete search history.

(56) References Cited

U.S. PATENT DOCUMENTS

| | | | | |
|---|---|---|---|---|
| 3,586,280 A | * | 6/1971 | Parduhn | 248/214 |
| 3,764,099 A | * | 10/1973 | Parduhn | 248/214 |
| 4,010,925 A | * | 3/1977 | Garchinsky | 248/295.11 |
| 4,489,910 A | * | 12/1984 | Ferguson | 248/219.4 |
| 6,798,970 B1 | * | 9/2004 | Brown et al. | 385/147 |
| 7,220,046 B2 | * | 5/2007 | Lee et al. | 362/655 |
| 2006/0023473 A1 | * | 2/2006 | Lee et al. | 362/647 |

FOREIGN PATENT DOCUMENTS

GB    2466013 A  *  6/2010 ............. E01F 9/011

* cited by examiner

*Primary Examiner* — Pedro J Cuevas
(74) *Attorney, Agent, or Firm* — Continuum Law; Robert P. Cogan

(57) ABSTRACT

Briefly stated, in accordance with the present subject matter, a generator system is provided. The assembly includes a turbine to be driven by exhaust air and a casing surrounding the turbine. The exhaust air issues from an exhaust structure. The turbine and the casing are each supported independently of the exhaust structure by a support structure. A generator is mechanically coupled to the turbine. The support structure is proportioned to mount the generator system in a selected juxtaposition with a preselected exhaust structure. A generator provides power to an output conductor. Power conditioning apparatus may be included in the system or may be located remotely.

16 Claims, 7 Drawing Sheets

GENERATOR SYSTEM FOR REUSING EXHAUST AIR

CROSS-REFERENCE TO RELATED APPLICATIONS

This application is a continuation-in-part of application Ser. No. 13/107,938, entitled "Green Power Generator Device," filed on May 15, 2011 now abandoned.

BACKGROUND OF THE INVENTION

1. Field of the Invention

The present subject matter relates to a generator system which reuses air exiting from an exhaust port.

2. Related Art

The push toward "green technology" has led to greater emphasis on recovering energy that would previously have gone to waste. Air issuing from exhaust fans is the source in many schemes.

United States Patent Application Publication Number 2011/0089701 discloses a system in which vertically flowing exhaust air from an axial fan is directed at a turbine having a horizontally disposed access which is supported on an exhaust port. The turbine is in the envelope of a right circular cylinder. This construction cannot be efficiently manufactured to intercept a common form of exhaust such as an axial fan. A smaller cylinder will intercept only a portion of the flow. A cylinder large enough to intercept the flow will require more energy to rotate.

United States Patent Application Publication Number 2010/0244455 discloses a square air conditioning unit providing a vertical airflow exhaust. An assembly in a housing sits on and it covers the air conditioner. The assembly contains a turbine. Due to this construction, the housing will create back pressure on the exhaust airflow, decreasing efficiency.

SUMMARY

The present subject matter is directed to a generator system which reuses exhaust air in an efficient manner and which can be constructed efficiently to meet the requirements of many architectural contexts.

Briefly stated, in accordance with the present subject matter, a generator system is provided. The assembly includes a turbine to be driven by exhaust air and a casing surrounding the turbine. The exhaust air issues from an exhaust structure. The turbine and the casing are each supported independently of the exhaust structure by a support structure. A generator is mechanically coupled to the turbine. The support structure is proportioned to mount the generator system in a selected juxtaposition with a preselected exhaust structure. A generator provides power to an output conductor. Power conditioning apparatus may be included in the system or may be located remotely.

BRIEF DESCRIPTION OF THE DRAWINGS

The present subject matter may be further understood by reference to the following description taken in connection with the following drawings.

DETAILED DESCRIPTION

Figure 1:
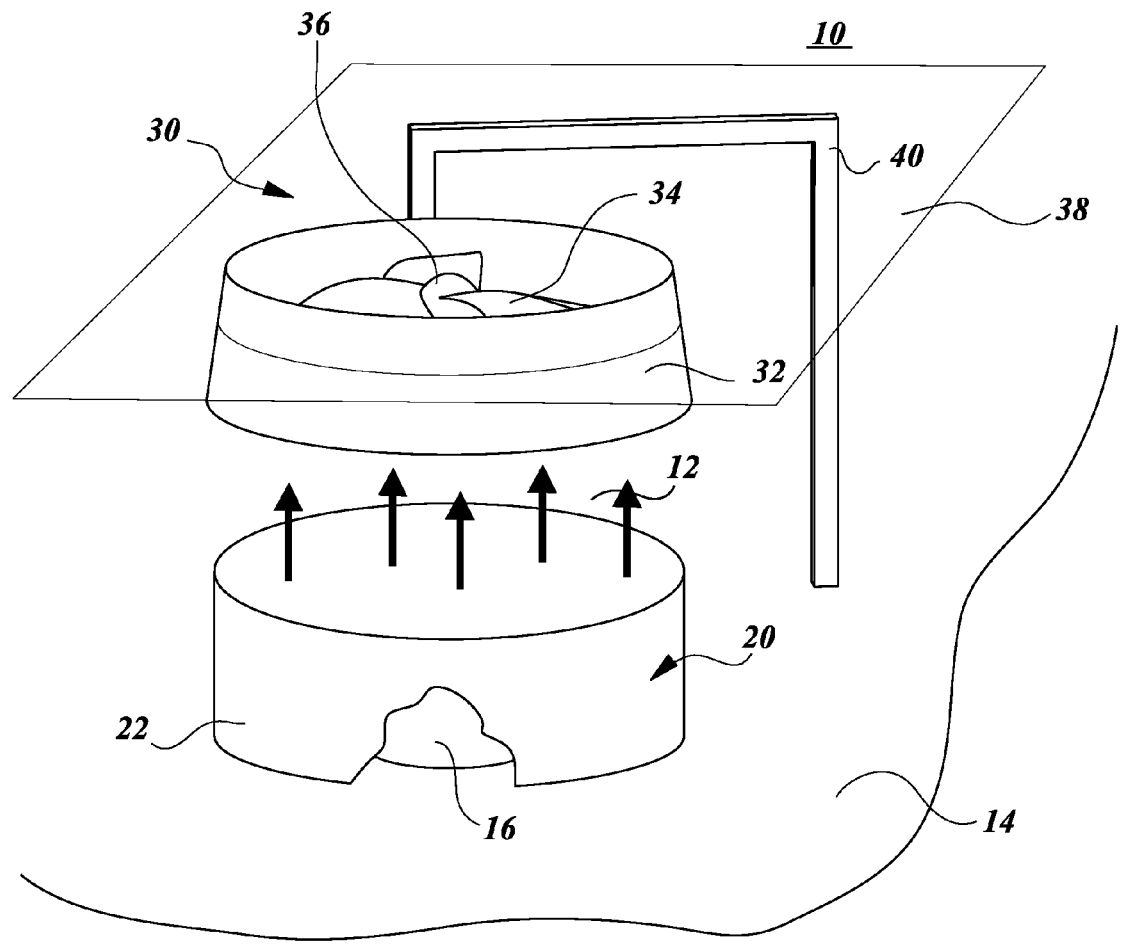
FIG. 1 is a diagram illustrating an installation incorporating the present subject matter.

FIG. 1 is a diagram illustrating a building installation 10 incorporating the present subject matter. Energy is extracted from exhaust air 12 in order to power a turbine. The installation 10 may comprise any of a number of types of locations. The present matter in FIG. 1 shows a building roof 14 having an exhaust unit 20 comprising an exhaust port 22 surrounding an exhaust fan 16. The exhaust port 22 may take many forms. In the present illustration, the exhaust port 22 comprises a cylinder surrounding the exhaust fan 16. Embodiments described below specifically illustrate exhaust fans comprising axial and radial fans. The current subject matter is not limited to any one particular form of fan. The preferred construction is in accordance with principles described below.

A generator system 30 comprises a casing 32 surrounding a turbine 34 in a radial dimension. The radial dimension may also be described as a horizontal plane 38. Terms such as horizontal and vertical are used to describe relative positions. They do not necessarily describe orientation with respect to the radius of the Earth. The turbine 34 drives a generator 36. The generator system 30 is suspended free of engagement with the exhaust unit 20 by a support 40. Commonly, a support 40 will support the generator system 30 a predetermined distance above the roof 14. The distance is determined in accordance with the teachings below.

Figure 2:
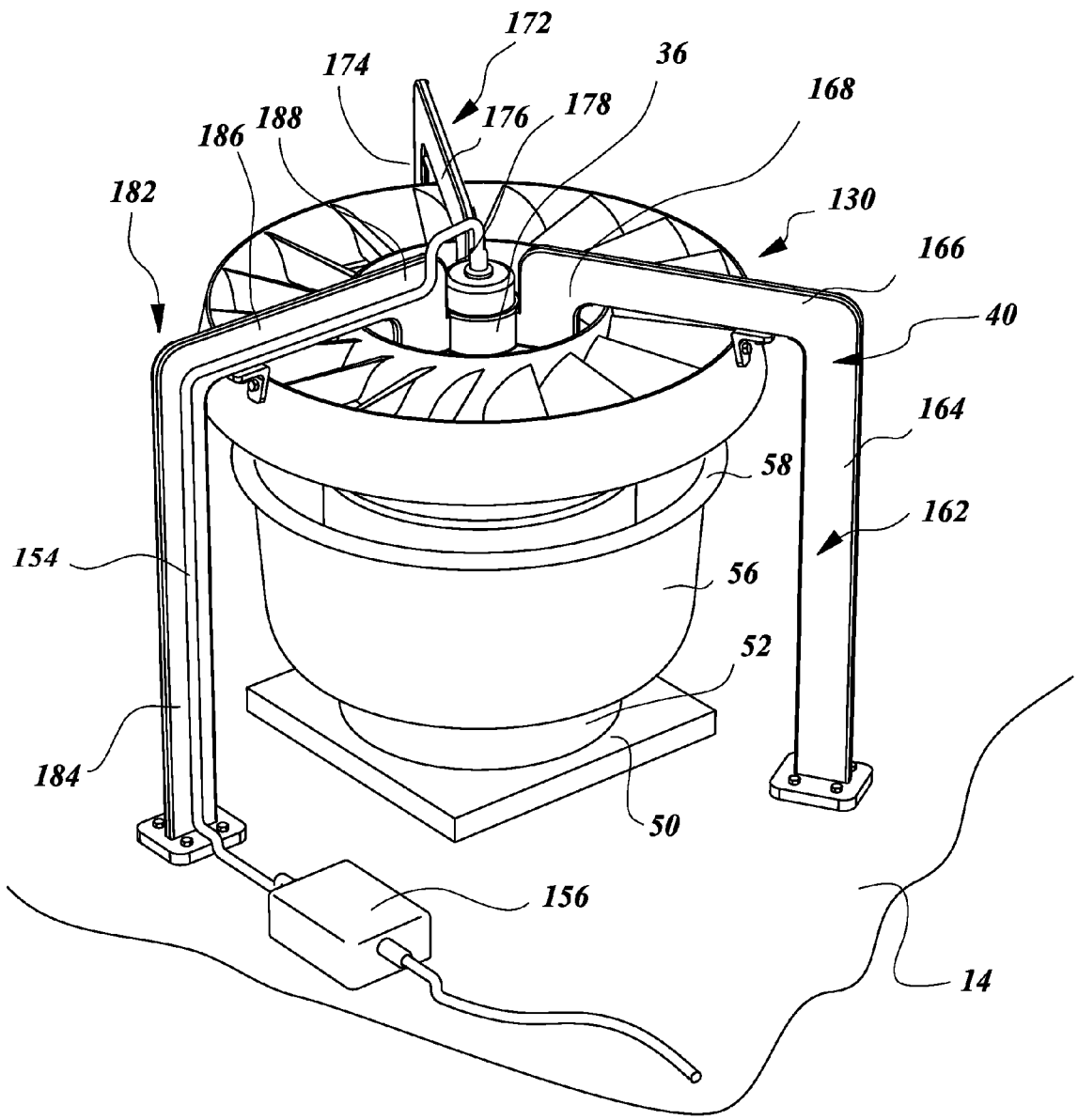
FIGS. 2, 3, and 4 are respectively an isometric view, a cross sectional view, and a partial detailed isometric view of a first embodiment driven by the exhaust of an axial fan.
Figure 3:
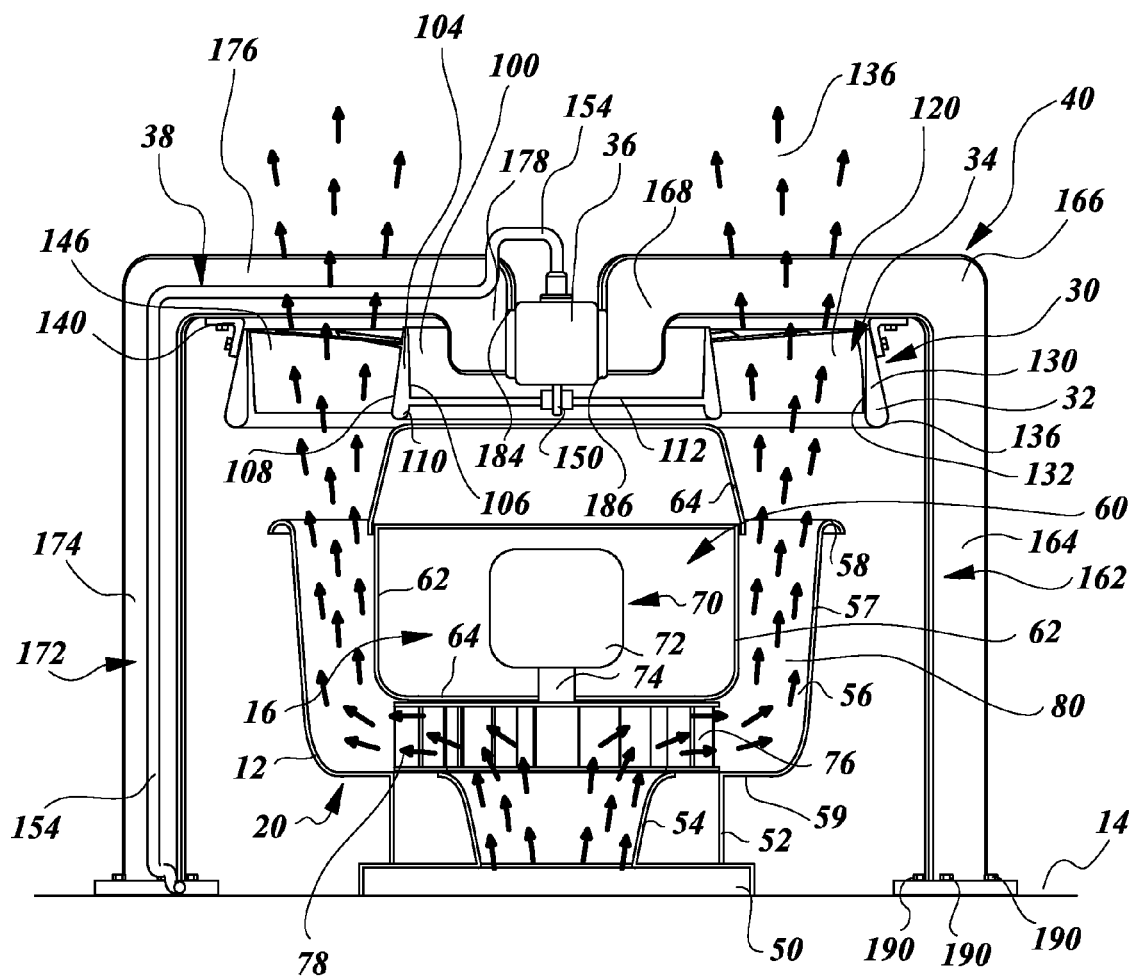
Figure 4:
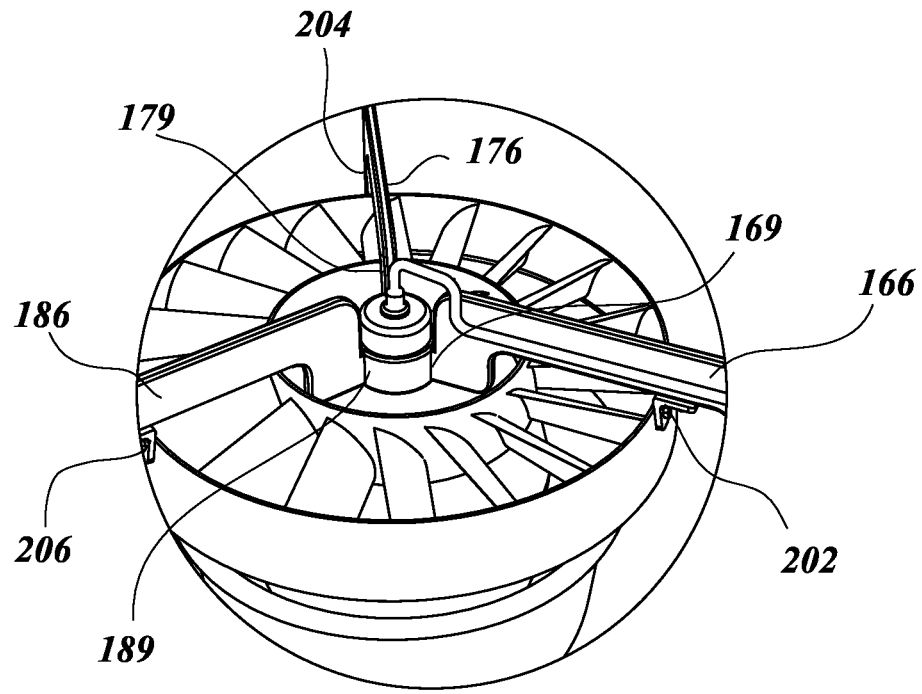

A first embodiment working in conjunction with an axial exhaust fan is described with respect to FIGS. 2, 3, and 4. These figures are respectively an isometric view, a cross-sectional view of an installation 10, and a partial detailed isometric view illustrating support of the casing 32 and turbine 34 to the support 40.

The exhaust unit 20 comprises a base 50 secured to the roof 14. A foot 52 surrounds an air outlet 54 (FIG. 3) supplying air to an annular path 56. A first, outer wall of the air path 56 is defined by a radially outer wall 57 of an exhaust port 58 having a lower wall 59 substantially horizontally disposed. A radially inner wall of the air path 56 is defined by an exhaust fan motor housing 60 comprising a radially inner wall 62 extending in an axial, or vertical, dimension. A horizontal wall 64 of the exhaust fan motor housing 60 is axially opposite the lower wall 59. A centrifugal fan 70 comprises a fan motor 72, driveshaft 74, and an impeller 76. The impeller 76 rotates to draw in air from the air outlet 54 and propel it through the air path 56.

Within the generator system 30, the casing 32 is supported free of engagement with the exhaust unit 20. In this manner, the generator system 30 can intercept the airflow 12 and at the same time avoid creating back pressure into the air path 56 (FIG. 3).

The turbine 34 comprises an annular hub 104. The annular hub 104 has a radially inner surface 106 and a radially outer surface 108. In one form, the radially outer surface 108 is canted with respect to the radially inner surface 106, and the two surfaces are joined at the lower end by a rounded portion 110 in order to form an airfoil. The turbine 34 is supported by radial support 112. Blades 120 extend radially from the hub 104.

The casing 32 has a radially inner surface 130 and a radially outer surface 132. In one form, the radially outer surface 132 is canted with respect to the radially inner surface 130, and the two surfaces are joined at the lower end by a rounded portion 136 in order to form an airfoil. Blades 120 extend radially from the hub 104. The annular hub 104 and the casing 32 define an air path 136. The casing 32 is supported to the support 40 by pieces 140 as further described below.

The axial, i.e., vertical cross section of the casing 32 is described by a geometrical function. In one form, the casing 32 comprises a truncated cone. Curves which are arcuate or which are defined by other functions could be embodied in the vertical cross section of the casing 32.

Figure 8:
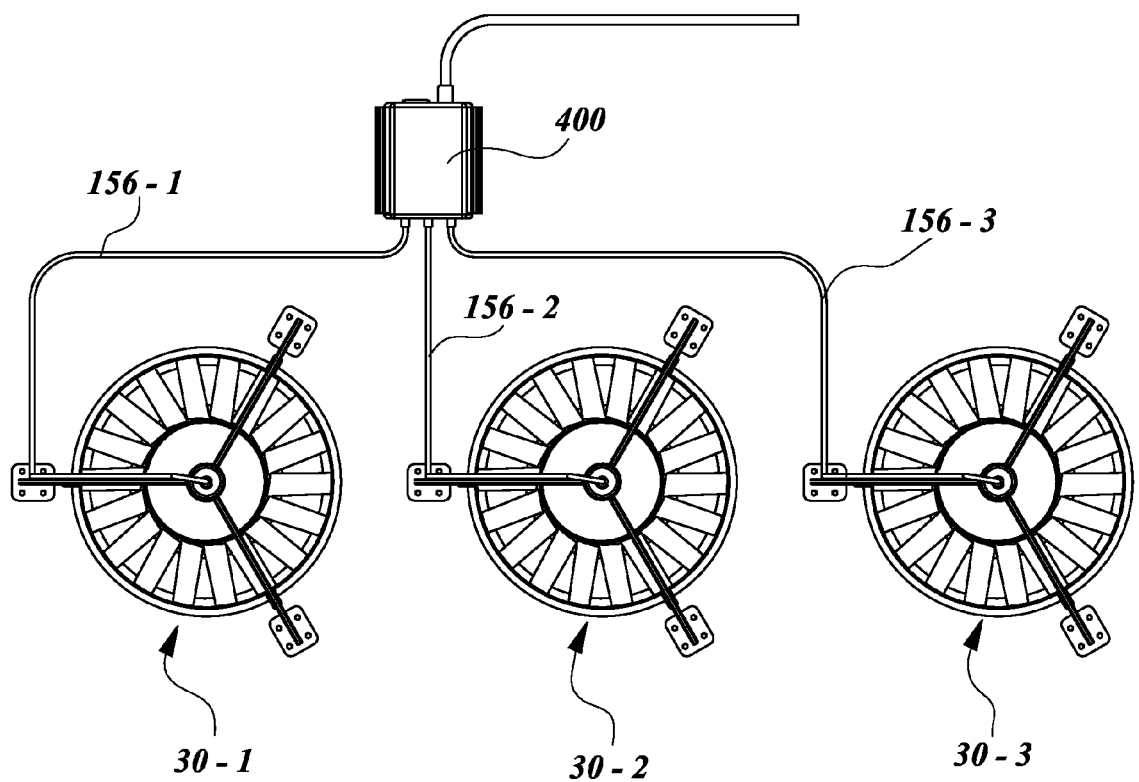
FIG. 8 is a plan view of embodiment in which a plurality of generator systems are connected to a single power conditioning circuit.

The turbine 34 is supported in a horizontal plane by radial support 112. Radial support 112 is coupled for rotation to a driveshaft 150 of the generator 36 and is supported by the driveshaft 150. Power conditioning may be provided at the generator 36. Usually, however, a conductor 154 is connected to the generator 36 and conducts power for conditioning elsewhere. In one form, an alternator 156 may be supported to the roof 14. Alternatives include processing power elsewhere or connecting the outputs of a plurality of generators 36 to a single power conditioning unit, e.g., power conditioning unit 400 (FIG. 8).

The support 40 (FIG. 1) may take many different forms. In the embodiment illustrated, the support 40 comprises first, second, and third support members 162, 172, and 182.

The first support member 162 comprises a first vertical leg 164, a radially inwardly extending leg 166, and a vertical inner leg 168. Similarly, the second support member 172 comprises a first vertical leg 174, a radially inwardly extending leg 176, and a vertical inner leg 178. The third support member 182 comprises a first vertical leg 184, a radially inwardly extending leg 186, and a vertical inner leg 188. Bolts 190 (FIG. 3) may fasten the support 40 to the roof 10.

The first, second, and third vertical inner legs 168, 178, and 188 extend axially, i.e., downwardly, from the legs 166, 176, and 186 respectively. They are dimensioned to place the generator system 30 at the preselected desired vertical position. The first, second, and third vertical inner legs 168, 178, and 188 are secured to the generator 36 at attachment points 169, 179, and 189 (FIG. 4). The attachment points 169, 179, and 189 may be equiangularly spaced. Attachment may be achieved by any of a number of means such as by welding, brazing, or by the use of fasteners.

As seen particularly in FIG. 4, each of the first, second, and third radially extending, i.e., horizontal, legs 166, 176, and 186 respectively support mounting brackets 202, 204, and 206, each mounting bracket being in radial registration with an outer diameter of the casing 32. Attachment may be achieved by any of a number of means such as by welding, brazing, or by the use of fasteners.

Figure 7:
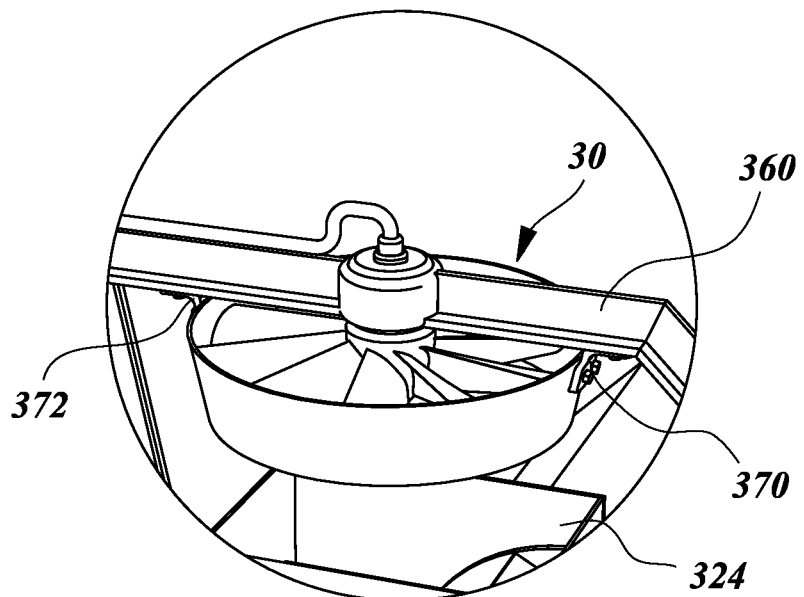
FIGS. 5, 6, and 7 are respectively an isometric view, a cross sectional view, and a partial detailed isometric view of a first embodiment driven by the exhaust of a radial fan.
Figure 5:
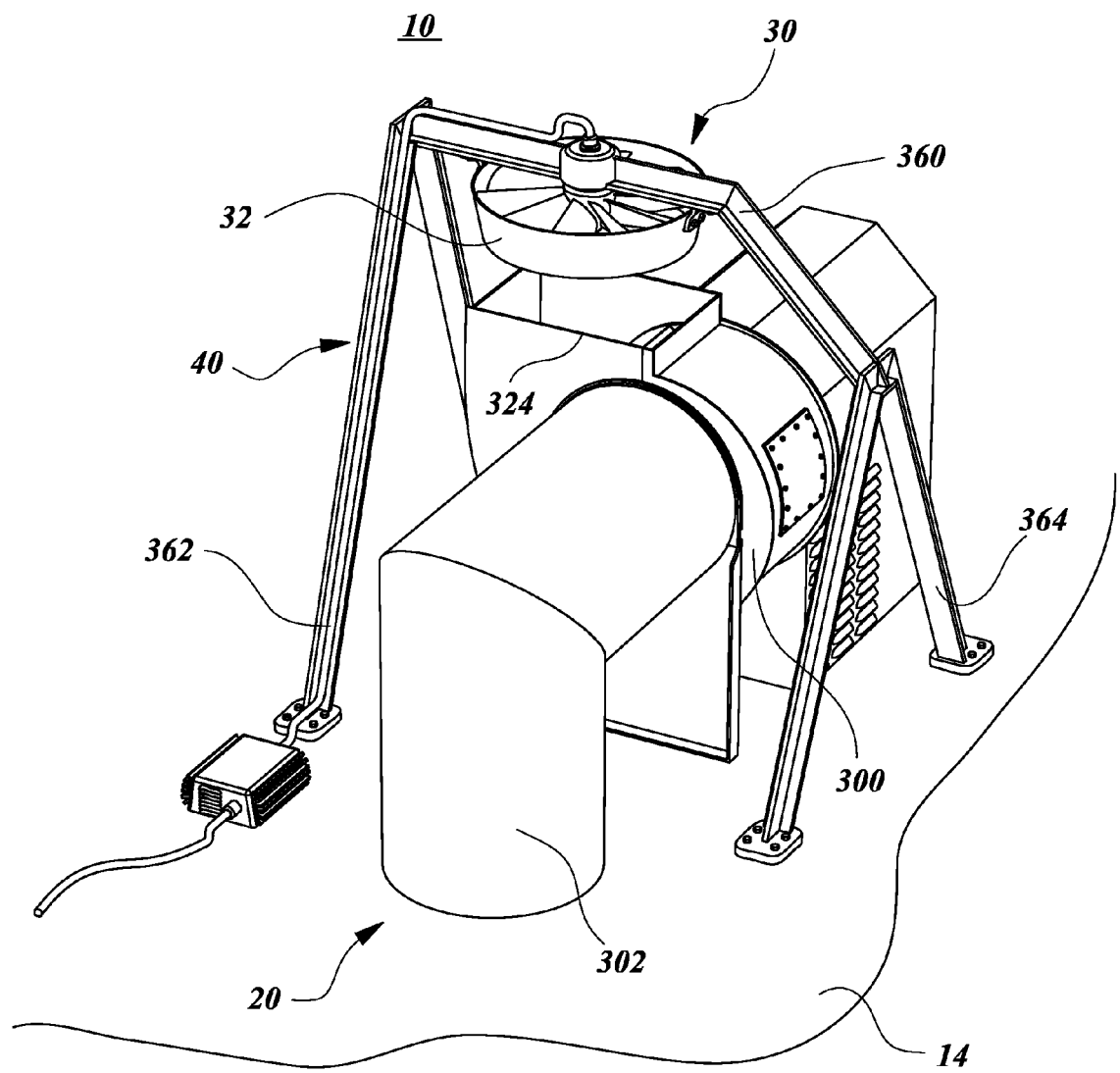
Figure 6:
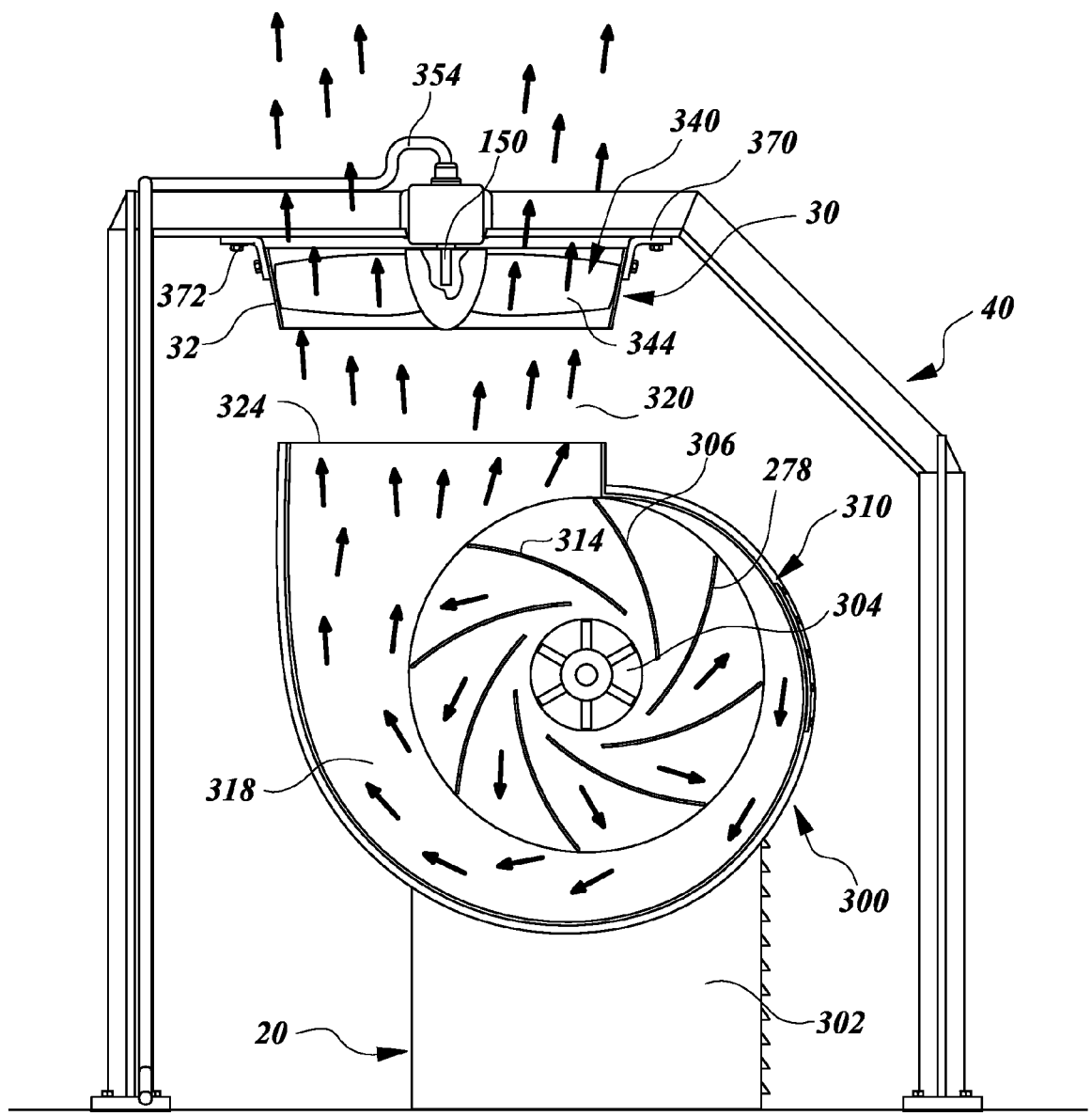

A second embodiment working in conjunction with a radial exhaust fan is described with respect to FIGS. 5, 6, and 7. These figures are respectively an isometric view, a cross-sectional view of an installation 10, and a partial detailed isometric view illustrating support of the casing 32 and turbine 34 to the support 40.

In the present example, a centrifugal exhaust fan 300 is mounted on the roof 14. The generating unit 30 may be constructed to work with centrifugal exhaust fans that are not necessarily mounted on top of the roof 14. Dimensioning the support 40 and other components in accordance with the present teachings will accommodate other configurations of exhaust fans.

Exhaust air is delivered to the exhaust unit 20. A duct 302 provides exhaust air to an intake eye 304 (FIG. 6) of an impeller 306 of a centrifugal fan 310. Impeller vanes 314 drive air to a centrifugal fan exhaust duct 318 which is positioned to provide an airflow 320 aimed at generating unit 30. In the present arrangement, the airflow 320 is directed vertically. The airflow 320 exits from the centrifugal fan 310 at an outlet 324. In the present embodiment, the outlet 324 is rectangular in a horizontal plane. It is desirable to intercept as much of the airflow 320 as practicable.

Therefore, a turbine 340 is provided with blades 344 substantially subtending the entire radial extent of the casing 30. The blades 344 extend from a central hub 350. The central hub 350 may have a curved lower axial surface 352 in order to reduce wind resistance. The central hub 350 is supported to a driveshaft 150 and with the turbine 340 rotates the driveshaft 150.

The support 40 comprises a horizontal bar 360 supported on opposite horizontal sides by first and second A-frame supports 362 and 364. The support is dimensioned to hold the generator system 30 at a desired vertical height. The desired vertical height is defined by a distance from the centrifugal fan outlet 324. This distance is an optimization of maximum air velocity capture by the generator system 30 versus back pressure created on the airflow 320.

The casing 32 is supported to horizontal bar 360 by first and second brackets 370 and 372, as seen particularly in FIG. 7. Attachment may be achieved by any of a number of means such as by welding, brazing, or by the use of fasteners.

FIG. 8 is a plan view of embodiment in which a plurality of generator systems are connected to a single power conditioning circuit. In this illustration, first, second, and third generator systems 30-1, 30-2, and 30-3 are provided. They deliver outputs respectively to conductors 156-1, 156-2, and 156-3, each of which is connected to a power conditioning circuit 400. The power conditioning circuit 400 may include various forms of circuitry. The outputs from the generator units may be combined. Alternatively the outputs may be selectively switched.

Alternating current generators could be used. However, in applications contemplated for the present subject matter, DC generators will be more cost-effective and more efficient.

While the foregoing written description of the subject matter enables one of ordinary skill to make and use what is considered presently to be the best mode thereof, those of ordinary skill will understand and appreciate the existence of variations, combinations, and equivalents of the specific embodiment, method, and examples herein. The subject matter should therefore not be limited by the above described embodiment, method, and examples, but by all embodiments and methods within the scope and spirit of the subject matter as claimed.

What is claimed is:

1. A generator system for reusing exhaust air provided from a preselected source of exhaust air providing air flow, the system comprising:
   a turbine, the turbine comprising a hub having an axis and rotating about the axis and further comprising vanes extending in a radial direction from the hub;
   a casing surrounding the vanes in a radial degree of freedom;
   a support having a portion extending in a vertical degree of freedom to suspend the turbine in the air flow free of engagement with an outlet of the preselected source and above the outlet;
   the support having a portion extending in a radial degree of freedom supporting the turbine in the air flow;
   the casing having an air inlet and an air outlet axially displaced from each other, the casing inlet being displaced from the outlet of the preselected source by a distance corresponding to an optimization of maximum air capture by the casing versus back pressure to the preselected source of exhaust air; and a dimension in the vertical degree of freedom of the support extending above a point in vertical registration with the outlet of the preselected source of exhaust air comprising a distance from the portion of the support extending in the radial degree of freedom to the air inlet of the casing plus said displaced distance from the outlet of the preselected source of exhaust air to the inlet of the casing.

2. A generator system according to claim 1 further comprising an electric generator coupled to and driven by the turbine.

3. A generator system according to claim 2 wherein the casing has an axial dimension substantially equal to an axial dimension of the turbine.

4. A generator system according to claim 3 wherein the turbine comprises a hub having an axis and rotating about the axis and further comprising vanes extending in a radial direction from the hub shaped such that the vanes each have a stem radially displaced from the axis and wherein the vanes fit within an annular envelope.

5. A generator system according to claim 4 wherein the hub comprises a cylinder.

6. A generator system according to claim 5 wherein an inner diameter of the hub is supported to the support.

7. A generator system according to claim 6 wherein the support comprises legs each having a portion axially displaced from the casing and a portion radially outwardly of the casing, the radially outward portions being dimensioned to support the turbine in an exhaust air flow path.

8. A generator system according to claim 3 wherein the hub is coaxial with the axis and the vanes are disposed to intercept air from a radially continuous exhaust air flow.

9. A generator system according to claim 8 in which the turbine is suspended from the support axially below the support.

10. A generator system according to claim 8 wherein the preselected source of exhaust air comprises an annulus and wherein an annulus defined by the hub and the casing has a larger axial dimension than the annulus defined by the source of exhaust air.

11. A generator system according to claim 3 wherein the casing comprises a ring having an axially inner surface and an axially outer surface.

12. A generator system according to claim 11 wherein the casing comprises a truncated cone.

13. A generator system according to claim 11 wherein an axial cross section of the ring comprises a curve.

14. A generator system according to claim 11 wherein the axially inner surface and the axially outer surface are relatively disposed to form an air foil.

15. A generator system for reusing exhaust air provided from a preselected source of exhaust air having an exhaust outlet and providing air flow, the generator system comprising:

a turbine, the turbine comprising a hub having an axis and rotating about the axis and further comprising vanes extending in a radial direction;

a casing surrounding the turbine in a radial degree of freedom, the casing defining an air path having an air inlet and an air outlet axially displaced from each other and providing an outer radial boundary of the air path;

a support supporting the casing and the turbine, the support having a portion extending in a radial degree of freedom supporting the turbine and casing in the air flow, the support having a portion extending in a vertical degree of freedom supporting the turbine and casing free of engagement with the exhaust outlet and axially displaced from the exhaust outlet wherein the displacement is a distance which is an optimization of maximum air capture by the generator system versus back pressure to the exhaust outlet; and the dimension in the vertical degree of freedom of the support extending above a point in vertical registration with the outlet of the preselected source of exhaust air comprising a distance from the portion of the support extending in the radial degree of freedom to the air inlet of the casing plus said displacement from the outlet of the preselected source of exhaust air to the inlet of the casing.

16. A generator system according to claim 15 wherein the casing and turbine are supported at a preselected height from the outlet of the preselected source of exhaust, and wherein the preselected height is a distance in correlation with a measurement of air capture by the turbine versus back pressure to the preselected source.

* * * * *